(12) United States Patent  (10) Patent No.: US 8,376,266 B2
Gemmati et al.  (45) Date of Patent: Feb. 19, 2013

(54) METHOD OF CONTROLLING A HYBRID HELICOPTER IN YAW, AND A HYBRID HELICOPTER PROVIDED WITH A YAW CONTROL DEVICE SUITABLE FOR IMPLEMENTING SAID METHOD

(75) Inventors: Bernard Gemmati, Lauris (FR); Nicolas Queiras, Aix en Provence (FR); Paul Eglin, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 398 days.

(21) Appl. No.: 12/774,283

(22) Filed: May 5, 2010

(65) Prior Publication Data

US 2010/0308154 A1 Dec. 9, 2010

(30) Foreign Application Priority Data

Jun. 4, 2009 (FR) ...................................... 09 02686

(51) Int. Cl.
*B64C 27/54* (2006.01)
*B64C 27/82* (2006.01)

(52) U.S. Cl. ... 244/17.19; 244/6; 244/17.11; 244/17.13; 244/175; 244/184

(58) Field of Classification Search ............... 244/6, 7 A, 244/17.11, 17.13, 17.19, 175, 184
See application file for complete search history.

(56) References Cited

U.S. PATENT DOCUMENTS

| 2,478,847 | A | * | 8/1949 | Stuart | 244/7 R |
|---|---|---|---|---|---|
| 2,653,778 | A | * | 9/1953 | Bennett et al. | 244/6 |
| 2,749,059 | A | * | 6/1956 | Meyers et al. | 244/7 R |
| 3,260,476 | A | * | 7/1966 | James | 244/7 R |
| 4,385,741 | A | | 5/1983 | Mootz | |
| 5,269,654 | A | * | 12/1993 | Chapman | 416/120 |
| 6,089,501 | A | * | 7/2000 | Frost | 244/8 |
| 6,467,726 | B1 | * | 10/2002 | Hosoda | 244/60 |
| 6,513,752 | B2 | * | 2/2003 | Carter, Jr. | 244/8 |
| 7,946,526 | B2 | * | 5/2011 | Zimet | 244/17.19 |

(Continued)

FOREIGN PATENT DOCUMENTS

EP 2 105 378 9/2009
FR 1 132 452 3/1957

(Continued)

OTHER PUBLICATIONS

French Search Report dated Feb. 18, 2009, from corresponding French application.

*Primary Examiner* — Philip J Bonzell
(74) *Attorney, Agent, or Firm* — Brooks Kushman P.C.

(57) ABSTRACT

A method of controlling the yaw attitude of a hybrid helicopter including a fuselage and an additional lift surface provided with first and second half-wings extending from either side of the fuselage, each half-wing being provided with a respective first or second propeller. The hybrid helicopter has a thrust control suitable for modifying the first pitch of the first blades of the first propeller and the second pitch of the second blades of the second propeller by the same amount. The hybrid helicopter includes yaw control elements for generating an original order for modifying the yaw attitude of the hybrid helicopter by increasing the pitch of the blades of one propeller and decreasing the pitch of the blades of the other propeller, the original order is optimized as a function of the position of the thrust control to obtain an optimized yaw control order that is applied to the first and second blades.

20 Claims, 6 Drawing Sheets

U.S. PATENT DOCUMENTS

| | | | |
|---|---|---|---|
| 8,052,094 B2 * | 11/2011 | Roesch | 244/177 |
| 8,070,089 B2 * | 12/2011 | Ferrier | 244/6 |
| 8,113,460 B2 * | 2/2012 | Roesch | 244/6 |
| 8,167,233 B2 * | 5/2012 | Brody et al. | 244/17.21 |
| 8,170,728 B2 * | 5/2012 | Roesch | 701/3 |
| 8,181,901 B2 * | 5/2012 | Roesch | 244/6 |
| 2002/0011539 A1 * | 1/2002 | Carter, Jr. | 244/6 |
| 2007/0170307 A1 * | 7/2007 | de la Cierva Hoces | 244/7 R |
| 2008/0294305 A1 | 11/2008 | Roesch | |
| 2009/0159740 A1 * | 6/2009 | Brody et al. | 244/17.21 |
| 2009/0321554 A1 * | 12/2009 | Roesch | 244/6 |
| 2010/0065677 A1 * | 3/2010 | Ferrier | 244/6 |
| 2010/0219286 A1 * | 9/2010 | Roesch | 244/6 |
| 2010/0224720 A1 * | 9/2010 | Roesch | 244/12.3 |

FOREIGN PATENT DOCUMENTS

| | | |
|---|---|---|
| FR | 2 476 013 | 8/1981 |
| FR | 2 916 421 | 11/2008 |
| GB | 613 715 | 12/1948 |

* cited by examiner

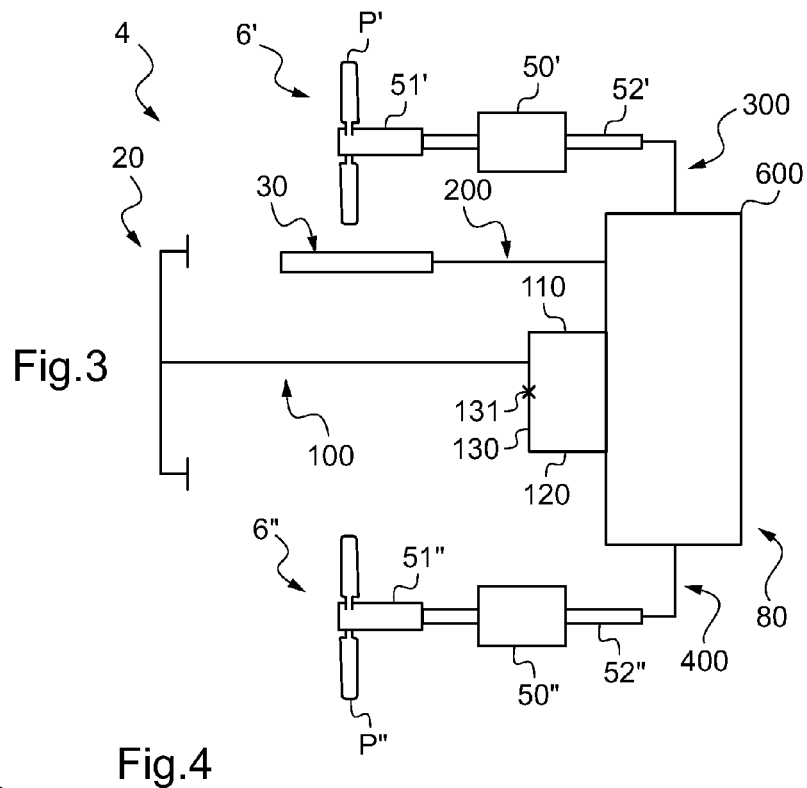
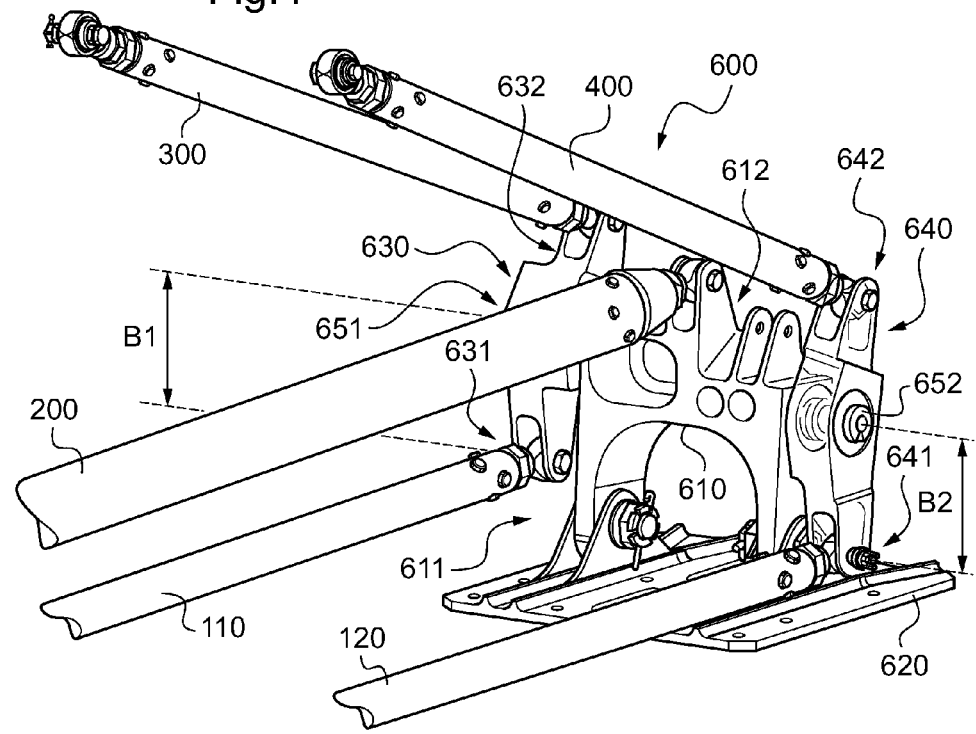

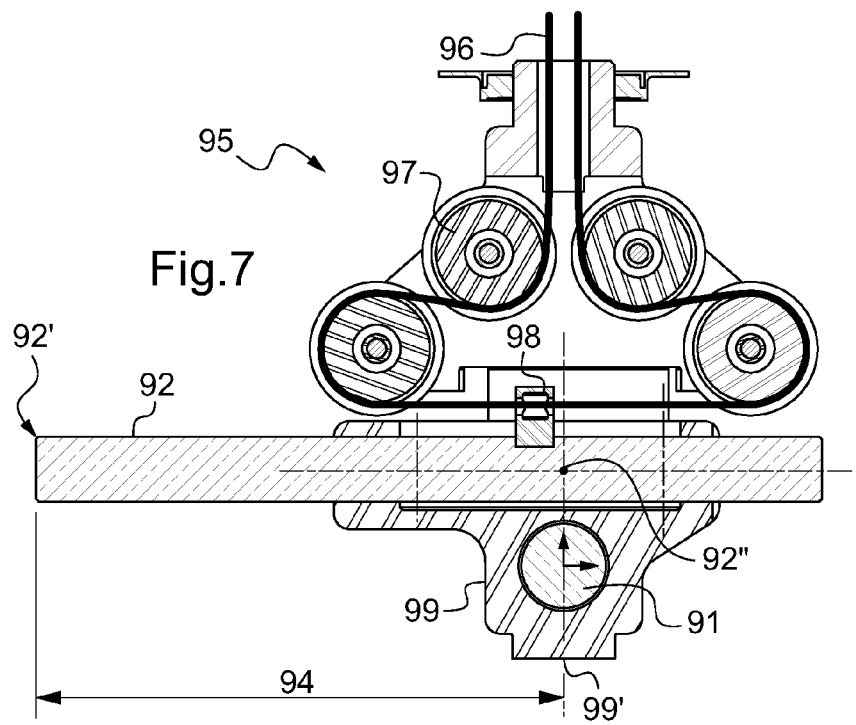
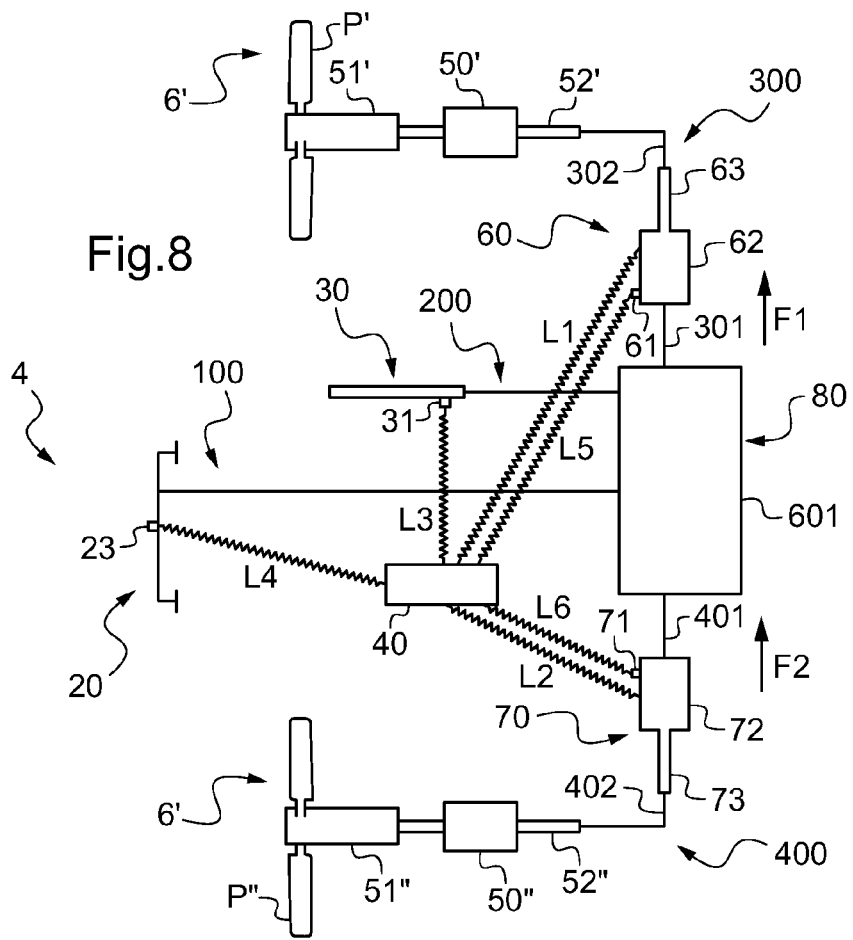

METHOD OF CONTROLLING A HYBRID HELICOPTER IN YAW, AND A HYBRID HELICOPTER PROVIDED WITH A YAW CONTROL DEVICE SUITABLE FOR IMPLEMENTING SAID METHOD

FIELD OF THE INVENTION

The present invention relates to a method of controlling a hybrid helicopter in yaw, and to a hybrid helicopter provided with a yaw control device suitable for implementing said method.

More particularly, the invention thus relates to a hybrid helicopter applying an advanced concept for a vertical takeoff and landing (VTOL) aircraft.

This advanced hybrid helicopter combines, at reasonable cost, the effectiveness in vertical flight of a conventional helicopter with the high travel speed performance made possible by using propulsive propellers and installing modern turbine engines.

BACKGROUND OF THE INVENTION

In order to understand the object of the invention clearly, it is appropriate to recall the main types of flying machine corresponding to airplanes and to rotorcraft.

The term "rotorcraft" is used to designate any aircraft in which lift is provided in full or in part by one or more propellers of substantially vertical axis and of large diameter, referred to as rotors or as rotary wings.

The rotorcraft category is itself subdivided into several distinct types.

Firstly, there is the helicopter, having at least one main rotor that is driven by a suitable power plant and that provides both lift and propulsion.

Then there is the autogyro, which is a rotorcraft in which the rotor does not receive power, but provides lift by autorotating under the effect of the forward speed of the aircraft. Propulsion is provided by a turbine engine or by a propeller of axis that is substantially horizontal in forward flight and that is driven by a conventional engine.

The gyrodyne is a rotorcraft intermediate between the helicopter and the autogyro, in which the rotor provides lift only. The rotor is normally driven by a power plant during stages of takeoff, hovering or vertical flight, and landing, like a helicopter. A gyrodyne thus includes an additional propulsive system that is essentially different from the rotor assembly.

In forward flight, the rotor continues to provide lift, but solely in autorotation mode, i.e. without power being transmitted to said rotor.

Several other novel formulae have been studied to a greater or lesser extent, and some of them have given rise to practical embodiments.

In this context, mention may be made of the compound helicopter that takes off and lands like a helicopter and that flies like an autogyro when cruising: its rotor performs autorotation because of the forward speed of the aircraft and provides some of its lift, with the remainder of its lift being provided by an auxiliary wing. A tractor propeller of substantially horizontal axis delivers the force needed for movement in translation. By way of example, document GB 613 715 describes a compound helicopter.

Similarly, document U.S. Pat. No. 6,513,752 describes an aircraft comprising:
a fuselage and a wing;
two variable pitch propellers;
a rotor with heavy weights "at their ends" (sic);
a power plant driving the two propellers and the rotor;
control means for adjusting the pitch of the propellers such that:
in forward flight, the thrust from the propellers is exerted towards the front of the aircraft; and
in hovering flight, the antitorque function is provided by one of the propellers delivering thrust towards the front and the other towards the rear of the aircraft, with the rotor being driven by the power plant; and
the power plant comprises an engine and a clutch that, by disconnecting the rotor from the engine, enables the rotor to rotate faster than an outlet from the engine, because of the above-mentioned weights.

In addition, it is specified that the clutch makes autogyro mode possible in forward flight. Consequently, the aircraft according to document U.S. Pat. No. 6,513,752 is of the compound type.

In addition, a power transmission gearbox disposed between the power plant and the propellers enables said propellers to operate at a plurality of different speeds of rotation relative to the speed at the outlet from said power source.

The convertible constitutes another particular formula for a rotorcraft. This term covers all rotorcraft that change configuration while in flight: takeoff and landing in a helicopter configuration; cruising flight in an airplane configuration; with two rotors being tilted through about 90 degrees as to act as propellers, for example.

Another novel formula is known that is referred to as a "hybrid" helicopter for convenience.

The hybrid helicopter has a fuselage with a main rotor for rotating blades under drive from at least one turbine engine.

In addition, the hybrid helicopter is provided with a wing made up of two half-wings, with two propulsive propellers being disposed on either side of the fuselage, on respective ones of the half-wings.

In addition, the hybrid helicopter has an integrated drive train that comprises not only the turbine engine(s), the rotor, and the two propellers, but also a mechanical system interconnecting those elements.

With this configuration, the speeds of rotation at the outlet (s) from the turbine engine(s), of the propellers, of the rotor, and of the mechanical interconnection system are all mutually proportional, with the proportionality ratio being constant regardless of the flying configuration of the hybrid helicopter under normal conditions of operation of the integrated drive train.

Consequently, and advantageously, the rotor is always driven in rotation by the turbine engine(s) and always delivers lift regardless of the configuration of the hybrid helicopter, both in forward flight and in hovering flight. The hybrid helicopter is thus neither an autogyro, nor a gyrodyne, nor a compound, but a novel type of rotorcraft.

More precisely, the rotor is designed to provide all of the hybrid helicopter's lift during stages of takeoff, landing, and vertical flight, and to provide some of its lift during cruising flight, with the wing then contributing a fraction of the lift of said hybrid helicopter.

Thus, the rotor provides the major fraction of the lift of the hybrid helicopter in cruising flight, possibly also provides a small contribution to the propulsive or traction forces, and always operates with minimum drag.

By modifying the pitch of the blades of the propellers of the hybrid helicopter collectively and by the same amount, it is also possible to control the thrust generated by the propellers.

In contrast, the antitorque and yaw control functions are performed by using differential thrust exerted by the propellers, e.g. by the pilot operating a rudder bar.

Nevertheless, it is found that abusive use of the rudder bar can lead to a maneuver that subjects the helicopter to severe mechanical stress, or even to the hybrid helicopter yawing violently.

The technical field of the invention is thus the narrow technical field of flight controls for a hybrid helicopter.

Nevertheless, mention may be made of patents FR 2 476 013 and FR 1 132 452 that describe devices for allowing a control surface to move with large amplitude at low speed, while restricting said movement at high speed.

Thus, according to patent FR 2 476 013, an adjustment member limits the movement of a control means that might be moved by a pilot, with the limitation being a function of a signal that is derived from a dynamic pressure.

In contrast, patent FR 1 132 452 provides for limiting the effects of moving control means on a control surface as a function of the forward speed of the aircraft, such that identical movement of the control means gives rise to different movements of the control surface as a function of said forward speed.

Although they are of interest, those solutions would appear to be poorly adapted to the very particular context of a hybrid helicopter.

In addition, document FR 2 916 421 describes a control system having a member for generating a mean pitch setpoint.

OBJECT AND SUMMARY OF THE INVENTION

The present invention thus has the object of proposing a method that enables the above-mentioned limitations to be avoided so as to preserve the physical integrity of a hybrid helicopter.

According to the invention, a method of controlling the yaw attitude of a hybrid helicopter that includes a fuselage and comprising:
- a main lift rotor arranged above the fuselage;
- an additional lift surface provided with first and second half-wings extending on either side of said fuselage, each half-wing being provided with a respective first and second propeller being disposed on either side of the fuselage;
- a mechanical interconnection system between the main rotor and said propellers, at least one turbine engine continuously driving in rotation the main rotor and the propellers meshing with the mechanical system; and
- a thrust control suitable for modifying the first pitch of the first blades of the first propeller and the second pitch of the second blades of the second propeller by the same amount, i.e. by a mean pitch;

is remarkable in that said hybrid helicopter includes yaw control means suitable for generating an original order for modifying the yaw attitude of said hybrid helicopter by increasing the pitch of the first blades of the first propeller and by decreasing the pitch of the second blades of the other propeller by a differential pitch, and said original order is optimized by a variable gain that is variable as a function of the thrust control so as to obtain an optimized yaw control order that is applied to said first and second blades.

Thus, the thrust control, e.g. a lever, serves to determine the mean pitch of the first and second blades of the first and second propellers. By moving the thrust control, the pilot acts in the same manner on said first and second blades of the first and second propellers.

In contrast, in order to control the hybrid helicopter in yaw, the pilot acts on yaw control means, e.g. a rudder bar.

The first and second pitches of the first and second blades then depart from their mean pitch, the pitch of the blades of one propeller increasing by a differential pitch while the pitch of the blades of the other propeller decrease by the same differential pitch. The pitch of one propeller is thus equal to the sum of the mean pitch plus the differential pitch while the pitch of the other propeller is equal to the difference between the mean pitch and the differential pitch. In other words, the differential pitch is equal to half the difference between the pitch of the second propeller minus the pitch of the first propeller, for example.

In addition, according to the invention, the differential pitch is determined as a function of the position of the thrust control in a manner that is novel and innovative.

The yaw control means give an original order tending to modify the pitch of the blades of the first and second propellers by an initial differential pitch.

For example, said original order O1 is given in differential pitch degrees, said original order being determined using the following formula in which DDN represents the differential pitch control in percent and "K" represents the absolute value of the maximum amplitude of said differential pitch at zero thrust:

$$O1 = K \times \frac{DDN - 50}{100}$$

Furthermore, "K" is determined as a function of the rotorcraft. For example, the differential pitch of a rotorcraft that varies over the range minus 9 degrees to plus 9 degrees gives an absolute value K for the maximum amplitude that is equal to 18 degrees.

With the yaw control means being a rudder bar suitable for pivoting clockwise or counterclockwise about a point, and with the value of K being 18 degrees, then DDN is equal, for example:
- to 0% when the rudder bar is turned clockwise to a first abutment that delivers an original order O1 equal to minus 9 degrees;
- 100% when the rudder bar is turned in the counterclockwise direction to a second abutment so as to deliver an original order O1 equal to plus 9 degrees; and
- 50% when the rudder bar is centered, i.e. when the pilot is exerting no force on the rudder bar, thereby causing an original order O1 to be delivered equal to 0 degrees.

Under such circumstances, depending on the embodiment, the original order given by the pilot is optimized by correcting it, by modulating it by a gain, or by both correcting it and modulating it by a gain, with the correction and/or the modification applied being variable as a function of the thrust control and thus optionally as a function of the position of the thrust control, so as to obtain an optimized order.

By way of example, in an embodiment, the pitch of the blades of the first and second propellers is modified by a differential pitch that is modulated, rather than by an original differential pitch delivered by the yaw control means, the modulated differential pitch being equal to the original differential pitch multiplied by a gain.

For example, the pilot moves the rudder bar to give an original order for increasing the pitch of the first propeller by 9 degrees and thus decreasing the pitch of the second propeller by 9 degrees.

However, given the position of the thrust control, that amount of variation is unnecessary. Assuming that the gain has a value of 0.5 because of the position of the thrust control, the original order will end up being modulated by being multiplied by said gain. Thus, the pitch of the first propeller is increased by 9 degrees multiplied by 0.5, i.e. 4.5 degrees, and the pitch of the second propeller is decreased by 9 degrees multiplied by 0.5, i.e. 4.5 degrees.

Consequently, the differential pitch variation between the first and second propellers is, ultimately, restricted as a function of a flight control.

By restricting this differential variation, it is guaranteed that there will be no violent yawing that might damage the hybrid helicopter.

The method implemented may also include one or more of the following characteristics.

In a first variant, the optimized order is equal to the original order with a corrective term added thereto in order to modify the differential pitch as a function of the thrust control.

Thus, to obtain the optimized order, the original order is corrected by adding to said original order a corrective term that is a function of the position of the thrust control in accordance with the following first relationship:

$$O2=O1+P0*[1-(PCOM/100)]$$

where O2 represents said optimized order in differential pitch degrees, O1 represents said original order in differential pitch degrees, P0 represents the differential pitch at zero thrust and when the yaw control means are centered, PCOM represents the resultant thrust percentage generated by the thrust control because of its position in percent, and "*" and "/" represent respectively the multiplication sign and the division sign.

In a second variant, the optimized order is equal to an original order modulated to limit the pilot's authority.

Thus, in order to obtain said optimized order, the original order is modulated by a variable gain that is variable as a function of the thrust control in accordance with the following second relationship:

$$O2=O1*G$$

where O2 represents said optimized order in differential pitch degrees, O1 represents said original order in differential pitch degrees, G represents said gain, and "*" represents the multiplication sign.

In a third variant, the optimized order is equal to a modulated original order having a corrective term added thereto to limit the pilot's authority and to modify the differential pitch as a function of the position of the thrust control.

Thus, in order to obtain said optimized order, the original order is modulated by a variable gain that is variable as a function of the position of the thrust control, and a corrective term is added to the resulting modulated order, which term is a function of the position of the thrust control, in accordance with the following third relationship:

$$O2=O1*G+P0*[1-(PCOM/100)]$$

where O2 represents said optimized order in differential pitch degrees, O1 represents said original order in differential pitch degrees for example, G represents said gain, P0 represents said differential pitch at zero thrust and when the yaw control means are centered, PCOM represents the resultant thrust percentage generated by the thrust control in percent because of its position, and "*" and "/" represent respectively the multiplication sign and the division sign.

Advantageously, the variable gain implemented in the second and third implementations decreases from a maximum gain applied when said thrust control generates a minimum resultant thrust from the first and second propellers towards a minimum gain applied when the thrust control generates a maximum resultant thrust from the first and second propellers.

More precisely, it is advantageous for the minimum gain to be equal to one-third of the maximum gain.

Furthermore, in a first alternative, it is advantageous for the gain and/or the corrective term to vary in application of a linear relationship so as to enable them to be implemented by means that are exclusively mechanical. Such a linear gain and linear corrective term give full satisfaction in terms of pilotability and comfort.

In particular, it is possible to envisage the gain decreasing from a maximum gain that is applied when the thrust control generates a minimum resultant thrust from the first and second propellers such as zero thrust in hovering flight, towards a minimum gain that is applied when the thrust control generates a maximum thrust from the first and second propellers.

Consequently, at high speed of the hybrid helicopter, the authority of the yaw control means is reduced by minimizing its action. Thus, the same order given by the yaw control means generates a greater variation in the pitch of the propeller blades at low speed than at high speed.

Furthermore, in the context of gain that varies linearly, the gain is optionally determined using the following fourth relationship where G represents said gain, GMIN said minimum gain, GMAX said maximum gain, PCOM the resultant thrust percentage generated by the position of the thrust control at a given instant, and "*" the multiplication sign $$G=GMAX-[(GMAX-GMIN)*(PCOM/100)]$$

It should be observed that the maximum gain and the minimum gain are determined by conventional testing as a function of the characteristics of the hybrid helicopter, with simulations making it possible to test various configurations, the person skilled in the art being capable of optimizing the values of said maximum and minimum gains. For example, the maximum gain is equal to unity while the minimum gain is equal to one-third.

Under such conditions, gain decreases linearly from a maximum gain GMAX when the thrust control is in a minimum position and generates zero thrust, to a minimum gain GMIN when the thrust control is in a maximum position and generates thrust equal to 100% of the maximum acceptable thrust, the percentage PCOM being equal to zero at zero thrust and to 100 at 100% of the maximum acceptable thrust.

In a second alternative, the gain and/or the corrective term may vary in application of a non-linear relationship. For example, by using actuator means under electronic control, it is possible for the gain and the corrective term to be caused to vary in application of an advantageous non-linear relationship, by allowing symmetrical yaw control authority in both directions relative to the yaw equilibrium position of the hybrid helicopter and enabling it to be piloted in stabilized flight with the yaw control means, a rudder bar, in a centered position.

In addition to the above-described method, the invention also provides a hybrid helicopter implementing the method.

Thus, according to the invention, a hybrid helicopter includes a fuselage and comprises:
  a main lift rotor arranged above the fuselage;
  an additional lift surface provided with first and second half-wings extending on either side of said fuselage, each half-wing being provided with a respective first or second propeller disposed on either side of the fuselage;
  a mechanical interconnection system between the main rotor and said propellers, at least one turbine engine continuously driving in rotation the main rotor and the propellers meshing with the mechanical system; and a thrust control suitable for modifying the first pitch of the first blades of the first propeller and the second pitch of the second blades of the second propeller by the same amount;

a yaw control device provided with yaw control means suitable for generating an original order for modifying the yaw attitude of said hybrid helicopter by increasing the pitch of said first blades and by decreasing the pitch of said second blades by a differential pitch; and a combiner suitable for combining a thrust control order given by the pilot to modify the first and second pitches collectively and a differential pitch control order given by the pilot to modify the yaw attitude of the hybrid helicopter.

In remarkable manner, the yaw control device includes adjustment means suitable for optimizing said original order as a function of the position of the thrust control in order to obtain an optimized yaw control order for application to said first and second blades.

Thus, the yaw adjustment means limit the differential pitch of the first and second blades as a function of the thrust control by varying an original order correcting it, by modulating it with a gain, or by both correcting and modulating it with a gain.

Consequently, a given movement of the yaw control means gives rise to modifications in the first and second pitches that differ as a function of the position of the thrust control.

The hybrid helicopter is then provided with one or more of the following characteristics.

For example, in order to correct the original order, the adjustment means may include first optimizer means.

These first optimizer means are represented by the combiner connected to the yaw control means via at least a left link and a right link optionally connected to the yaw control means via a first main linkage. Furthermore, the combiner is connected to the thrust control by a second main linkage, to a first control member for controlling the first pitch via a first secondary linkage, and to a second control member for controlling the second pitch via a second secondary linkage.

Thus, the combiner is a combiner/coupler comprising:

a carrier structure having a first end zone hinged on a support with a second end zone hinged to said second main linkage;

a first lever having a first end hinged to the left link and a second end hinged to the first secondary linkage, said first lever being free to pivot about a first fastener axis fastening it to said carrier structure;

a second lever having a first end hinged to the right link and having a second end hinged to the second secondary linkage, said second lever being free to pivot about a second fastener axis fastening it to said carrier structure; and a first lever arm separating the first end of the first lever from said first fastener axis being shorter than a second lever arm separating the second end of the second lever from said second fastener axis.

Thus, the combiner is suitable for correcting an original order given by the yaw control means or modulated by auxiliary means, by adding a corrective term that is a function of the position of the thrust control, the corrective term advantageously being equal to:

$$P0*[1-(PCOM/100)]$$

where P0 represents the differential pitch at zero thrust when the yaw control means are centered, PCOM represents the resultant thrust percentage generated by the thrust control in percentage, and "*" and "/" represent respectively the multiplication sign and the division sign.

Furthermore, in order to modulate the original order, the adjustment means may include second optimizer means.

The second optimizer means are represented by a crank arranged in series in a first main linkage between an upstream first main linkage connected to the yaw control means and a downstream first main linkage going to the combiner, and connected directly or indirectly thereto. The crank is provided with an upstream radius and a downstream radius forming an angle between them, e.g. of ninety degrees, the upstream radius being fastened to the upstream first main linkage while the downstream radius is connected to the downstream first main linkage.

The crank also includes quotient-varying means for varying the quotient of the second length of the downstream radius divided by the first length of the upstream radius, these quotient-varying means being mechanically controlled by the thrust control.

Thus, the quotient of the second length of the downstream radius divided by the first length of the upstream radius is modulated by a gain that is variable as a function of the position of the thrust control. This quotient decreases as a function of the position of the thrust control from a maximum gain, applied when said thrust control generates a minimum resulting thrust from the first and second propellers, to a minimum gain applied when the thrust control generates a maximum resulting thrust from the first and second propellers so that a first movement D1 of the upstream first main linkage gives rise to a second moment D2 of the downstream first main linkage given by:

$$D2=D1*G$$

where G represents the variable gain produced by the crank.

In the first above-described alternative, the variable gain applies a linear relationship, whereas in the second alternative the variable gain applies a non-linear relationship.

To modulate the original order, the adjustment means may include third optimizer means.

The third optimizer means include a first adjustable element of a first secondary linkage and a second adjustable element of a second secondary linkage, and first computer means of said adjustment means. Said first computer means are then suitable for modifying the lengths of the first and second adjustable elements as a function of the thrust control to modulate the original order by a variable gain that varies as a function of the position of the thrust control.

At least one adjustable element comprises an actuator secured to an upstream secondary linkage and to a downstream secondary linkage, the actuator being provided with an actuator body and an actuator rod, the yaw control means moving the upstream secondary linkage via a combiner over a first distance DIS1 in a first travel direction, and the first computer means cause the actuator rod to be moved relative to the actuator body over a second distance DIS2 in a second travel direction opposite to the first travel direction, the second distance being determined by the first computer means using the following equation:

$$DIS2=DIS1*(1-G)$$

where G represents the variable gain.

Optionally, the adjustment means then include one position sensor per adjustable element connected to the first computer means to provide it with information relating to the length of the corresponding adjustable element.

In addition, the thrust control device optionally includes a thrust sensor connected to the first computer means to provide it with first information relating to the position of the thrust control. The thrust sensor then enables the adjustment means to determine the position of the thrust control and to deduce therefrom the value of said variable gain.

Similarly, in order to know the yaw pitch variation order given by the pilot, the yaw control device optionally includes a yaw sensor connected to the first computer to provide it with second information relating to the position of said yaw control means.

Thus, the adjustment means are capable of acting on at least one adjustable element to modulate the yaw pitch variation order given by the pilot, where necessary and as a function of the thrust control, by adjusting the length of said mechanical adjustable element.

In another aspect, in order to modulate and/or correct the original order, the adjustment means may include fourth optimizer means.

The fourth optimizer means comprise a second computer connected in particular firstly to the thrust control and to the yaw control via electrical or optical connections, and secondly to first and second control actuators for controlling respective first and second control members for controlling the first and second pitches, the second computer means optimizing said original order as a function of the position of the thrust control to obtain an optimized yaw control order that is applied to the first and second control actuators.

In a first variant embodiment suitable for implementing the first variant of the method, the adjustment means are then provided with the first optimizer means.

In a second embodiment suitable for implementing the second variant of the method, the adjustment means are then provided with the second optimizer means.

In a third embodiment suitable for implementing the second variant of the method, the adjustment means are provided with the third optimizer means.

In a fourth embodiment suitable for implementing the third variant of the method, the adjustment means are then provided with the first optimizer means and with the second optimizer means.

In a fifth embodiment suitable for implementing the third variant of the method, the adjustment means are then provided with the first optimizer means and with the third optimizer means.

Finally, in a sixth embodiment suitable for implementing any of the variants of the method, the adjustment means are provided with the fourth optimizer means.

BRIEF DESCRIPTION OF THE DRAWINGS

The invention and its advantages appear in greater detail in the context of the following description of embodiments given by way of illustration and with reference to the accompanying figures, in which:

FIG. 3 is a block diagram showing a yaw control device in a first embodiment;

FIG. 4 is a diagram showing a combiner of the combiner/coupler type used in particular in the first embodiment;

FIG. 7 is a diagram showing a crank used in particular in the second embodiment;

FIG. 8 is a diagram showing a yaw control device in a third embodiment of the invention;

Elements that are present in more than one of the figures are given same references in each of them.

MORE DETAILED DESCRIPTION

Figure 1:
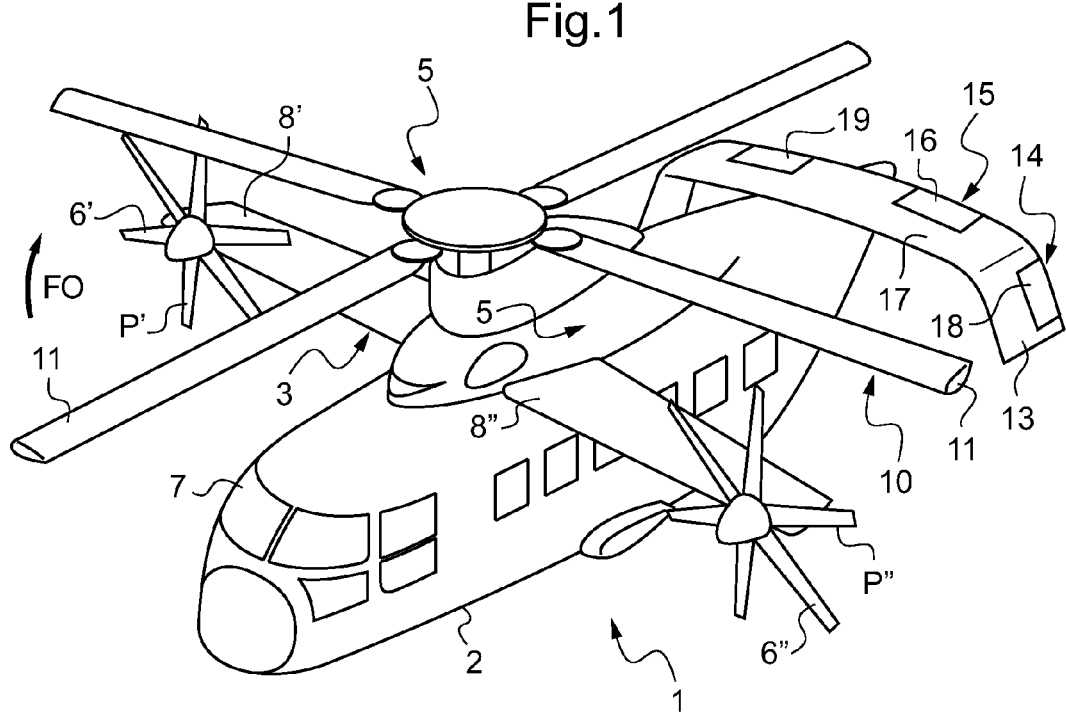
FIG. 1 is a view of a hybrid helicopter.

FIG. 1 shows a hybrid helicopter 1 comprising a fuselage 2 with a cockpit 7 provided at the front thereof, a rotor 10 for rotating blades 11 under drive from two turbine engines 5 located on top of the fuselage 2, on either side of the fuselage 2 about the longitudinal plane of symmetry of the apparatus, and acting via a first main gearbox, not shown in FIG. 1.

In the example described, the rotor 10 turns clockwise when seen from above, as shown by arrow F0.

It should be observed that the two turbine engines 5 are not shown in FIG. 1 because of the presence of fairings.

Furthermore, the hybrid helicopter 1 is provided with a high wing 3 made up of two half-wings 8' and 8" located at the top of the fuselage 2.

The hybrid helicopter 1 is propelled by first and second propellers 6' and 6" driven by the two turbine engines 5, a respective one of the propellers 6', 6" being located at each outer end of the wing 3. The first and second propellers 6', 6" have respectively six first blades P' and six second blades P", in the example shown.

In the vicinity of the rear end of the fuselage 2, there are optionally also provided stabilizer and control surfaces, both for pitch, in the form of a horizontal stabilizer 15 with two pitch controls 16 and 19 that are movable relative to a front portion 17, and for yaw, in the form of two vertical stabilizers 14 each at a respective end of the horizontal stabilizer 15.

Specifically, the horizontal stabilizer 15 and the vertical stabilizers 14 form an upside-down U-shape on the fuselage 2.

Advantageously, the stabilizers 14, which are vertical or inclined relative to the vertical, may themselves be constituted by stationary front portions 13 with rear moving portions 18.

Compared with other aircraft, this hybrid helicopter 1 is remarkable in particular in that the speeds of rotation at the outlets from the turbine engines, of the propellers, of the rotor, and of the mechanical interconnection system are mutually proportional, with the proportionality ratio being constant regardless of the flight configuration of the hybrid helicopter under normal conditions of operation of the integrated drive train.

To control the advance of the hybrid helicopter, the pilot has a thrust control serving to modify the mean pitch of the first and second blades P', P" of the first and second propellers 6', 6".

More precisely, the thrust control acts identically on the first and second pitches of the first and second blades P', P" so as to obtain a collective variation in said first and second pitches. For example, the pilot may request an increase of 5 degrees for all of the blades of the propellers so as to increase the resultant thrust as generated in particular by the first and second propellers.

It can be understood that this resultant thrust lies in the range 0% of the maximum acceptable thrust for the hybrid helicopter to 100% of said maximum acceptable thrust.

In order to control the yaw attitude of the hybrid helicopter, the pilot has a yaw control device provided with yaw control means, conventionally a rudder bar, so as to vary the first and second pitches of the first and second propellers P', P" not collectively, but differentially.

In order to avoid being confronted with maneuvers that might degrade the physical integrity of the hybrid helicopter, the orders given by the yaw control means are voluntarily optimized as a function of the thrust control.

Thus, when the pilot requests an initial differential variation of the first and second pitches by ordering the pitch of the blades of one propeller to increase from an initial differential value and the pitch of the blades of the other propeller to decrease from said initial differential value, the order that is issued is optimized as a function of the thrust control.

More precisely, the original order given by the pilot is corrected, or modulated, or modulated and corrected so as to obtain an optimized order for optimized differential pitch variation. As a result, the pitch of the blades of one propeller is ordered to increase by an optimized differential pitch while the pitch of the blades of the other propeller is ordered to decrease by said optimized differential pitch.

More precisely, in a first variant of the method implemented by the invention, the original order O1 is corrected by adding to said original order O1 a corrective term that is a function of the position of the thrust control, in application of the following first relationship:

$$O2=O1+P0*[1-(PCOM/100)]$$

where O2 represents the optimized order, P0 represents the differential pitch at zero thrust when the yaw control means are centered, PCOM represents the resultant thrust percentage generated by the thrust control as a result of its position in percentage, and "*" and "/" represent respectively the multiplication sign and the division sign.

In a second variant, the optimized order O2 is equal to the original order O1 modulated by a variable gain G in compliance with the following second relationship:

$$O2=O1*G$$

In a preferred third variant, the optimized order O2 is equal to the original order O1 modulated by a gain G, with a corrective term being added thereto in compliance with the following third relationship:

$$O2=O1*G+P0*[1-(PCOM/100)]$$

where P0 represents said differential pitch at zero thrust when the yaw control means are centered, PCOM represents the resultant thrust percentage generated by the thrust control 30 in percentage as a result of its position, and "*" and "/" represent respectively the multiplication sign and the division sign. In the second and third variants, the gain G that is used then varies advantageously as a function of thrust, in linear manner in a first alternative and in non-linear manner in a second alternative.

Figure 2:
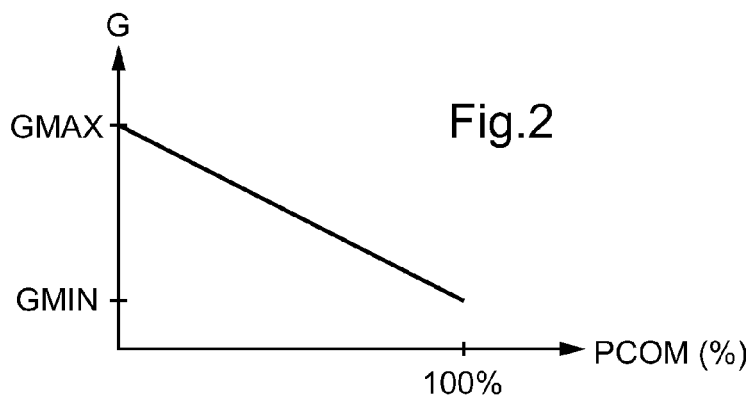
FIG. 2 is a first graph explaining the variation of said gain as a function of the thrust control in a first alternative.

FIG. 2 is a first graph for explaining gain variation in the first alternative for putting a ceiling on differential pitch.

This first graph plots along the abscissa the thrust percentage PCOM generated in particular by the first and second propellers 6' and 6" under the control of the thrust control, and it plots the gain G up the ordinate.

It should be observed that this modulated gain G decreases linearly from a maximum gain GMAX at zero thrust towards a minimum gain GMIN at a maximum thrust corresponding to 100% of the acceptable thrust for said hybrid helicopter, the maximum gain GMAX advantageously being equal to one unit, while the minimum gain GMIN is advantageously equal to one-third of said maximum gain GMAX.

The gain G is optionally determined with the help of the following fourth relationship in which PCOM represents the resultant thrust percentage generated by the position of the thrust control at a given instant, and "/" and "*" represent respectively the division sign and the multiplication sign:

$$G=GMAX-[(GMAX-GMIN)*(PCOM/100)]$$

FIG. 3 shows a first embodiment of the invention implementing the first variant of the method as explained above.

The yaw control device 4 comprises yaw control means 20, a rudder bar, connected by a first main linkage 100 to a combiner 80.

More precisely, the first main linkage 100 is hinged to an intermediate rocker 130 suitable for performing rocking motion about a pivot 131, said intermediate rocker being connected to a combiner by a left link 110 and a right link 120.

The combiner 80 is also connected to a first control rod 52' of a first hydraulic valve 50' by a first secondary linkage 300. As a function of the orders given by the pilot, the first control rod 52' is moved so that the first hydraulic valve 50' connects a first servo-control 51' to the hydraulic circuit of the hybrid helicopter so as to modify the first pitch of the first blade P' of the first propeller 6'.

Similarly, the combiner 80 is connected to a second control rod 52" of a second hydraulic valve 50" via a secondary linkage 400. As a function of the orders given by the pilot, the second control rod 52" is moved so that the second hydraulic valve 50" connects a second servo-control 51" to the hydraulic circuit of the hybrid helicopter so as to modify the second pitch of the second blades P" of the second propeller 6".

Furthermore, the yaw control device 4 has a thrust control 30 connected to the combiner 80 via a second main linkage 200.

Under such conditions, the combiner 80 adds the mean pitch order given by the thrust control 30 and the differential pitch order given by the yaw control means 20. Consequently, the pitch of one propeller corresponds to the sum of the mean pitch plus the differential pitch, while the pitch of other propeller corresponds to the difference of the mean pitch minus the differential pitch.

Furthermore, the yaw control device 4 includes adjustment means for optimizing the original order given by the pilot via the pilot's yaw control means 20 and as a function of the position of the thrust control 30.

In the first embodiment, the adjustment means include the combiner 80 which is in fact a combiner/coupler 600 suitable for correcting the original order by a corrective term that depends on the thrust control 30.

FIG. 4 is a diagram of such a combiner 80 of the combiner/coupler type 600.

Thus, the combiner/coupler 600 comprises a carrier structure 610 movable relative to a support 620 of the hybrid helicopter.

This carrier structure is hinged by two branches of its first extreme zone 611 to the support 620, e.g. via ball joints. Furthermore, the carrier structure 610 is hinged to the second main linkage 200 by a branch of its extreme zone 612. Thus, a longitudinal movement of the second main linkage 200 causes the carrier structure to pivot about its support hinges 620.

Furthermore, the combiner/coupler 600 is provided with a first lever 630, a first end 631 of the first lever 630 being hinged by a ball joint to the left link 110 while the second end 632 of the first lever 630 is hinged via a ball joint to the first secondary linkage 300.

The first lever 630 is then fastened to the carrier structure 610 via a first fastener axis 651 that is hidden in FIG. 4. Conventional means, e.g. a ball bearing, are arranged between the first fastener axis 651 and the first lever 630 so as to enable the first lever 630 to pivot about said first fastener axis 651.

Similarly, the combiner/coupler 600 is provided with a second lever 640, a first end 641 of the second lever 640 being hinged by a ball joint to the right link 120 while the second end 642 of the second lever 640 is hinged by a ball joint to the second secondary linkage 400

The second lever 640 is then fastened to the carrier structure 610 via a second fastener axis 652. Conventional means, e.g. a ball bearing, are arranged between the second fastener axis 652 and the second lever 640 so that the second lever 640 can pivot relative about said second fastener axis 652.

Finally, it can be seen that the first lever arm B1 between the first end 631 of the first lever 630 and its pivot point, i.e. its first fastener axis 651, is less than the second lever arm B2 between the first end 641 of the second lever 640 and its pivot point, i.e. its second fastener axis 652.

When the pilot operates the thrust control 30, the second main linkage 200 causes the carrier structure 610 to pivot so as to become inclined relative to the support 620

As it pivots, the carrier structure takes the first and second levers with it, thereby modifying the first and second pitches.

In contrast, when the pilot operates the yaw control means 20, the left link 110 moves in a first direction, thereby causing the first lever 630 to turn about the first fastener axis 651 and thereby modifying the first pitch. The right link 120 moves at the same time in a second direction opposite to the first direction, thereby causing the second lever 640 to turn about the second fastener axis 652 and thereby modifying the second pitch. The carrier structure 610 is then not caused to pivot.

In a second variant of the method, the adjustment means do not correct the original order, but modulate it as a function of a gain G.

Figure 5:
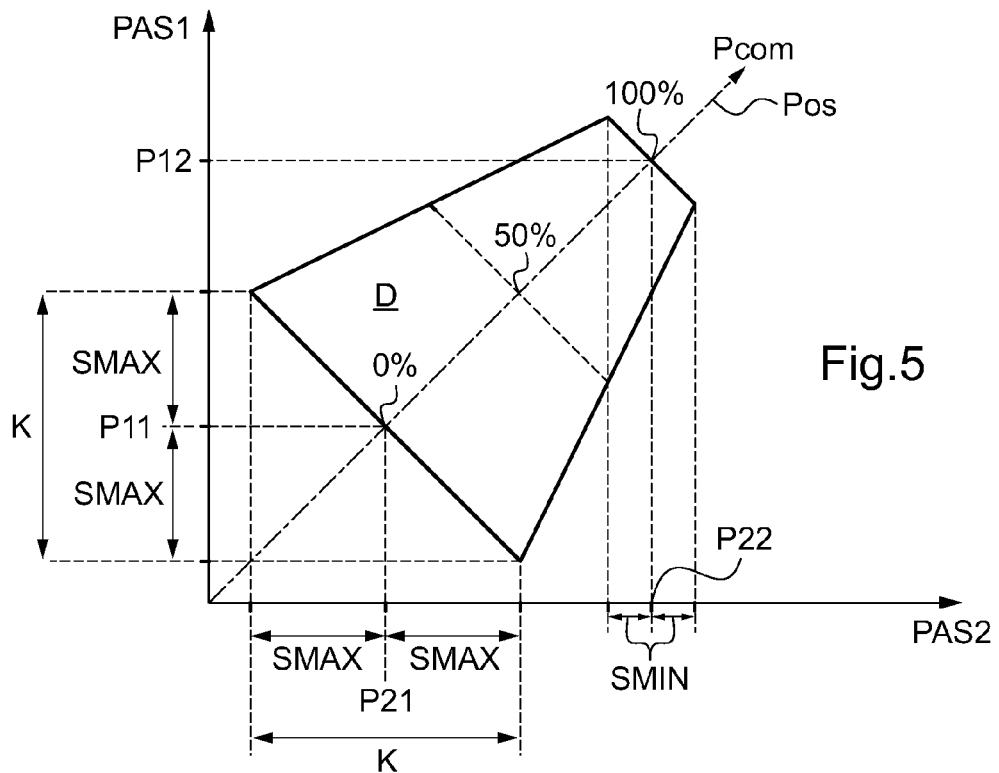
FIG. 5 is a second graph showing the domain to which the authority of the control means is restricted in a second variant of the method of the invention.

FIG. 5 is a second graph showing the domain D to which the original order, as given by the yaw control means, is restricted as a result of said gain G, and thus in accordance with said second variant.

This second graph plots the first pitch PAS1 of the first blades P' of the first propeller 6' up the ordinate and the second pitch PAS2 of the second blades P'' of the second propeller 6'' along the abscissa.

Furthermore, this second graph has a third axis showing the thrust percentage PCOM generated in particular by the first and second propellers 6' and 6'' under the control of the thrust control. It should be observed that the ordinate of the second graph is symmetrical to the abscissa of the second graph about the third axis.

It should be observed that the mean pitch of the first and second blades P', P''' lies on a fourth axis POS. This fourth axis POS coincides with the third axis PCOM of symmetry of the domain D.

Consequently, at a percentage of the thrust PCOM generated in particular by the first and second propellers 6', 6'' that is equal to zero, the pitch of the first blades is equal to P11, e.g. 30 degrees, whereas the pitch of the second blades is equal to P21, e.g. equal to 30 degrees.

In contrast, at a percentage of the thrust PCOM generated in particular by the first and second propellers 6', 6'' that is equal to 100, the pitch of the first blades is equal to P12, e.g. equal to 60 degrees, for example, whereas the pitch of the second blades is equal to P22, e.g. equal to 60 degrees, with the mean pitch necessarily having been increased via the thrust control.

To pilot the hybrid helicopter in yaw, the pilot will move away from the mean pitch by a differential pitch using the yaw control means.

Nevertheless, the differential pitch is modulated, thus enabling the orders given by the yaw control means to be contained within the domain D as shown.

Thus, when the percentage thrust PCOM generated in particular by the first and second propellers 6', 6'' is equal to zero, the maximum differential pitch has a ceiling at a maximum level SMAX, e.g. 15 degrees.

Because of the variable gain, the maximum movement of the yaw control means gives rise to a maximum differential pitch that is modulated with a ceiling, e.g. of 15 degrees, at zero thrust.

Similarly, when the percentage thrust PCOM generated in particular by the first and second propellers 6', 6'' is equal to 100, the maximum differential pitch has a ceiling at a minimum level SMIN, e.g. 5 degrees.

Because of the variable gain, said maximum movement of the yaw control means gives rise to a maximum differential pitch that is modulated with a ceiling at 100% of thrust that is equal to 5 degrees, for example, instead of 15 degrees at zero thrust.

Figure 6:
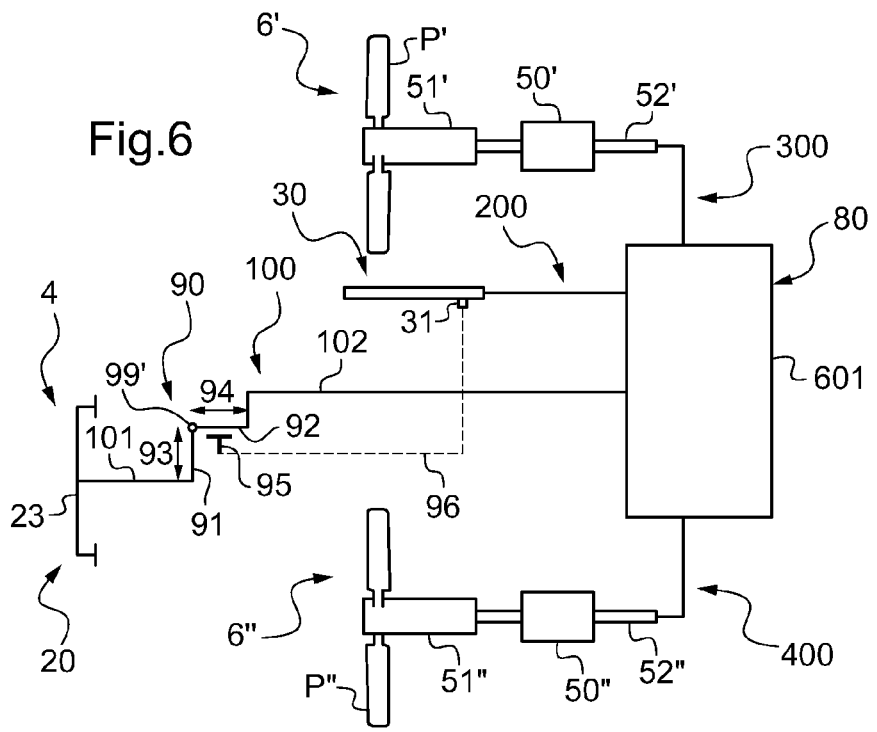
FIG. 6 is a diagram showing a yaw control device in a second embodiment.

FIG. 6 shows a second embodiment implementing the above-described second variant.

The yaw control device 4 comprises yaw control means 20, a rudder bar, and a thrust control 30 connected to the combiner 80 respectively via first and second main linkages 100, 200.

Unlike the first embodiment, the combiner 80 is a simple conventional combiner 601 and not a combiner/coupler 600.

The combiner 80 then does not add a corrective term to the original order.

In the second embodiment, the adjustment means possess second optimization means not for correcting the original order given by a pilot via the yaw control means 20, but rather for modulating it by a gain G.

Thus, the adjustment means comprise a crank 90 arranged between an upstream first main linkage 101 hinged to the yaw control means 20 and a downstream first main linkage 102 hinged to the combiner 80.

More precisely, the crank 90 has an upstream radius 91 and a downstream radius 92 constrained to pivot together about a pivot point 99', the upstream radius 91 and the downstream radius 92 being substantially mutually perpendicular.

In addition, the crank 90 is provided with quotient-varying means 95 suitable for modifying the quotient of the second length 94 from the free end of the downstream radius to the pivot point 99' of the downstream radius 92 divided by the first length 93 going from the free end of said upstream radius to the pivot point 99' of the upstream radius 91, as a function of the thrust control 30.

These quotient-varying means 95 thus include a connection, a belt 96 connecting it to the thrust control 30. When the pilot operates the thrust control 30, the belt 96 moves the downstream radius 92 longitudinally so as to reduce the second length connecting its end to the pivot point 99'.

FIG. 7 is a diagram describing the crank 90.

The crank 90 has a body 99 having passing therethrough both a first arm representing the downstream radius 92 and a second arm representing the upstream radius 91, the body 99 being suitable for pivoting about the pivot point 99'.

In addition, the crank 90 is provided with quotient-varying means 95 having a belt 96 passing through a set of tensioning pulleys 97 to be connected to a peg 98 on the first arm.

When the pilot operates the thrust control 30, the belt 96 moves the peg 98, and as a result moves the first arm. The second length 94 between the free end of the downstream radius and the pivot point 92" is then lengthened or shortened.

FIG. 8 shows a third embodiment implementing the above-described second variant.

The yaw control device 4 includes yaw control means 20, a rudder bar, and thrust control means 30 connected to the combiner 80 respectively via first and second main linkages 100, 200.

Like the second embodiment, the combiner 80 is a simple conventional combiner 601 and not a combiner/coupler 600.

The adjustment means then possess third optimization means not for correcting the original order given by a pilot via the yaw control means 20, but rather for modulating it by a gain G.

Thus, the adjustment means comprise first and second adjustable elements 60, 70 arranged respectively on the first and second secondary linkages 300, 400.

More precisely, the first adjustable element 60, such as a first electrical actuator provided with an actuator body 62 and an actuator rod 63, is fastened firstly to a first upstream secondary linkage 301 connected to the combiner 80, and secondly to a first downstream secondary linkage 302 connected to the first control rod 52' of the first hydraulic valve 50'.

It will be understood that a given movement of the yaw control means 20 could give rise to a different movement of the first control rod 52' depending on the stroke of the actuator rod 63 relative to the actuator body 62 of the first actuator of the first adjustable element 60. A given stroke for the first upstream secondary linkage 301 generates a different stroke for the first downstream secondary linkage 302 as a function of the stroke of the actuator rod 63 relative to the actuator body 62 of the first actuator of the first adjustable element 60.

Similarly, the second adjustable element 70, such as a second electrical actuator having an actuator body 72 and an actuator rod 73 is fastened firstly to a second upstream secondary linkage 401 connected to the combiner 80, and secondly to a second downstream secondary linkage 402 connected to the second control rod 52" of the second hydraulic valve 50".

Consequently, the yaw control device 4 possesses adjustment means 40 connected to the first and second adjustable elements, i.e. the first and second actuators 60, 70 via first and second wired or wireless links L1, L2, depending on requirements. The adjustment means 40, a first computer, for example, can then modify the lengths of the first and second adjustable elements as a function of the thrust PCOM generated in particular by the first and second propellers 6', 6", and thus as a function of the thrust control 30.

In addition, the yaw control device 4 is advantageously fitted with a thrust sensor 31 of the angle sensor type, suitable for sending a first signal to the adjustment means 40 via a third link L3. With the help of this first signal, the adjustment means 40 can know the position of the thrust control 30 by conventional methods.

In FIG. 8, the third link is a wired link, however it is possible to envisage the position sensor 31 communicating with the adjustment means 40 via a wireless link.

In addition, in order to determine the order given initially by the pilot, the adjustment means 40 is connected to a yaw sensor 23, via a fourth link L4, optionally a wired link, arranged on the yaw control means 20. The yaw sensor 23 then transmits second information to the adjustment means 40 relating to the yaw control order as given.

Finally, the adjustment means are connected to a first position sensor 61 via a fifth link L5, which sends third information to the adjustment means 40 relating to the length of the first adjustable element 60. Similarly, the adjustment means are connected to a second position sensor 71 by a sixth link L6, with the second position sensor 71 sending fourth information to the adjustment means 40 relating to the length of the second adjustable element 70.

When the pilot gives the original order O1, the yaw control means 20 are moved, e.g. to generate an increase in the first pitch PAS1 of the first blades P' and thus a decrease in the second pitch PAS2 of the second blades P". Under such circumstances, the upstream secondary linkage 301 tends for example to move in the direction of the first arrow F1 through a first initial distance DIS1, e.g. of 16 centimeters (cm).

The adjustment means 40 then receives information from the yaw sensor 23 relating to the order given by the pilot.

Consequently, the adjustment means 40 determine the gain G as a function of the position of the thrust control, e.g. a gain of 0.5.

The adjustment means 40 then order partial retraction of the first adjustable element 60 through an adjustment second distance DIS2 that is a function of the gain G in application of the following equation:

$$DIS2 = DIS1 * (1-G)$$

Consequently, for a first distance of 16 cm and for a gain of 0.5, the actuator rods of the first and second actuators are caused to move through a length 8 cm.

More precisely, the adjustment means 40 orders the actuator rod of an actuator to move in a travel direction opposite to the travel direction of the associated upstream secondary linkage.

Thus, in the example described, the adjustment means 40 order the retraction of the actuator rod 63 of the first actuator through a length of 8 cm.

The first downstream secondary linkage 302 of the first secondary linkage 300 finally moves through a distance subjected to a ceiling, which distance is equal to the first distance DIS1 minus the adjustment second distance DIS2, and thus equal to 8 cm in this example.

Consequently, the first pitch PAS1 of the first blades P' is increased solely by the modulated differential pitch.

In parallel, the second upstream secondary linkage 401 tends to move in the direction of arrow F2 through the first initial distance DIS1.

The adjustment means 40 then orders the second adjustable element 70 to extend in part, and thus to extend the actuator rod 73 of the second actuator over a length of 8 cm.

Furthermore, in a third variant of the method, the adjustment means modulate the original order as a function of a gain G and then correct it with the help of a corrective term.

Figure 9:
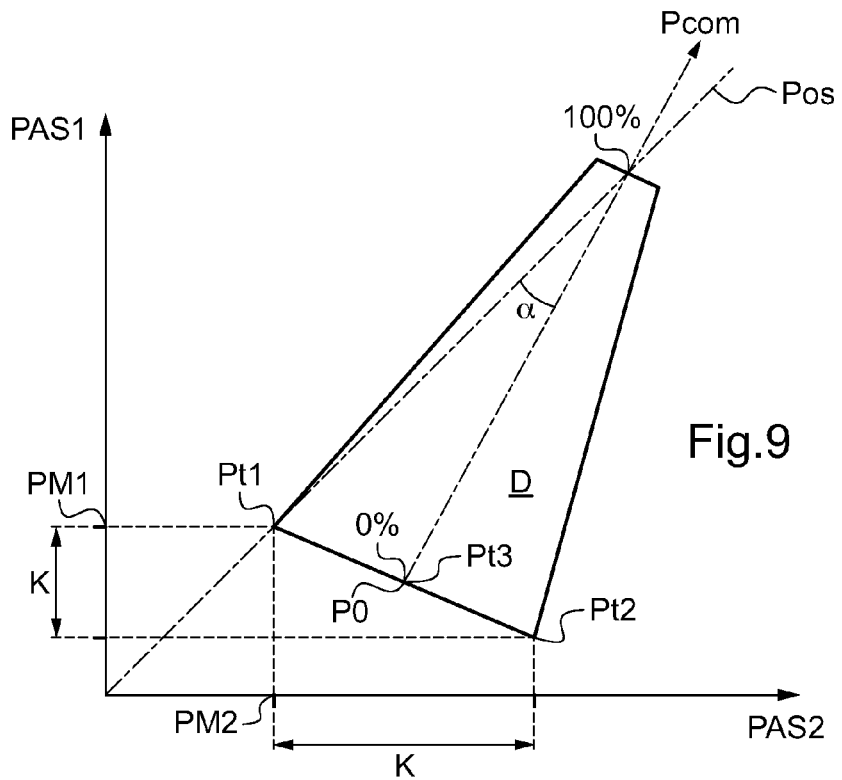
FIG. 9 is a third graph showing the domain to which the authority of the control means is restricted in a third variant of the method of the invention.

FIG. 9 is a third graph plotting the domain D to which the original order is restricted in said third variant.

This third graph plots the first pitch PAS1 of the first blade P' of the first propeller 6' up the ordinate and the second pitch PAS2 of the second blades P" of the second propeller 6" along the abscissa.

In addition, this third graph has a third axis showing the thrust percentage PCOM generated in particular by the first and second propellers 6' and 6", and controlled by the thrust control, together with a fourth axis POS representing the mean pitch of the blades under the control of the thrust control.

Unlike the second variant of the method as explained with reference to the second graph of FIG. 5, it should be observed that the ordinate of the third graph is no longer symmetrical to the abscissa of the third graph about the third axis.

Introducing the corrective term causes the third axis PCOM to be inclined at an angle α relative to the fourth axis POS.

At the first point Pt1, there is a situation in which:
thrust is zero; and
the pilot has pushed the yaw control means home in the clockwise direction.

In contrast, at the second point Pt2, the system is in a situation in which:
the thrust is zero; and
the pilot has pushed the yaw control means home in the counterclockwise direction.

Finally, at point Pt3, the system is in a situation in which:
the thrust is zero; and
the pilot has not acted on the yaw control means, which are therefore centered.

It can then be seen that the corrective term induces a differential pitch, e.g. equal at P0 to +9 degrees. Under such circumstances, assuming that the yaw control means are capable of generating an absolute value having a maximum amplitude K of 18 degrees:
at the first point Pt1, and thus when the pilot has pushed the yaw control means home in the clockwise direction, the yaw control means induce a differential pitch equal to P0 minus the absolute value of the maximum amplitude divided by two, i.e. a differential pitch that is zero; and
at the second point Pt2, and thus when the pilot has pushed the yaw control means home in the counterclockwise direction, the yaw control means induce a differential pitch equal to P0 plus the absolute value of the maximum amplitude divided by two, i.e. a differential pitch of more than 18 degrees.

Surprisingly, at zero thrust, the first point Pt1 gives the mean pitch PM1, PM2 of the first and second pitches PAS1, PAS2, with the modulated original order in this example countering the corrective term.

In the third variant, the optimized order O2 is thus obtained from the original order O1 with the help of the following third relationship:

$$O2=O1*G+P0*[1-(PCOM/100)]$$

where O2 represents said optimized order, O1 represents said original order, G represents said gain, P0 represents said differential pitch at zero thrust when the yaw control means 20 are centered, P0 being equal to +9 degrees in this example, PCOM represents the resultant thrust percentage generated by the thrust control 30 as a percentage, and "*" and "/" represent respectively the multiplication sign and the division sign.

Figure 10:
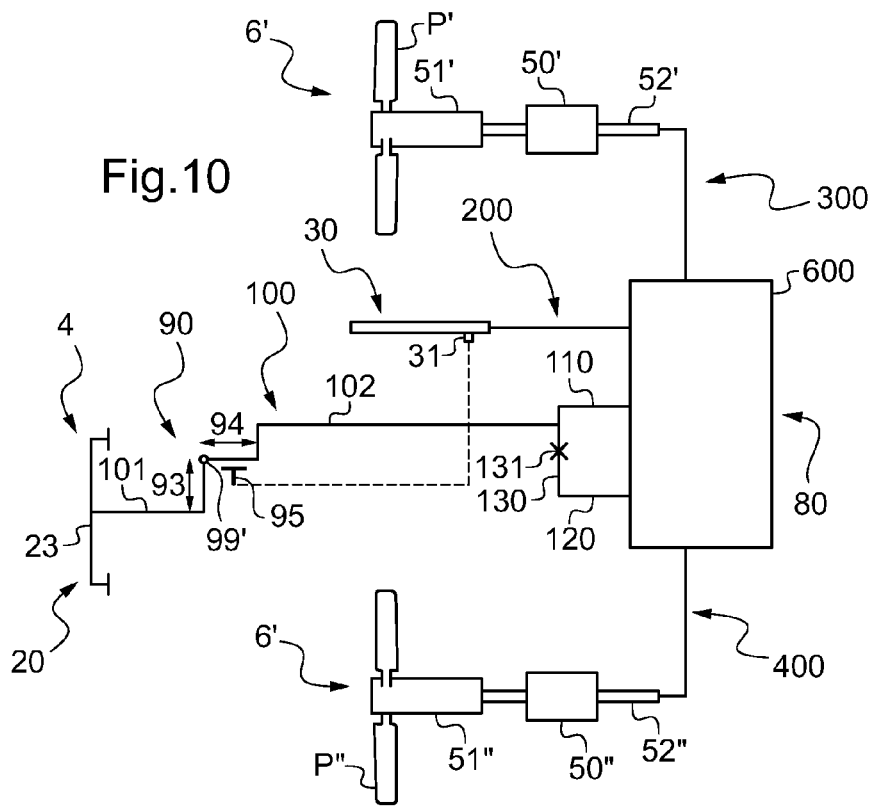
FIG. 10 is a diagram showing a yaw control device in a fourth, preferred embodiment.

FIG. 10 shows a fourth embodiment, i.e. the preferred embodiment of the invention that is suitable for implementing the third variant of the method.

In this fourth embodiment, the adjustment means comprise the crank and the combiner 80 of the combiner/coupler type 600 as shown respectively in FIGS. 6 and 3.

The fourth embodiment is thus obtained by replacing the conventional combiner 601 of the second embodiment with the combiner/coupler 600 of the first embodiment.

Figure 11:
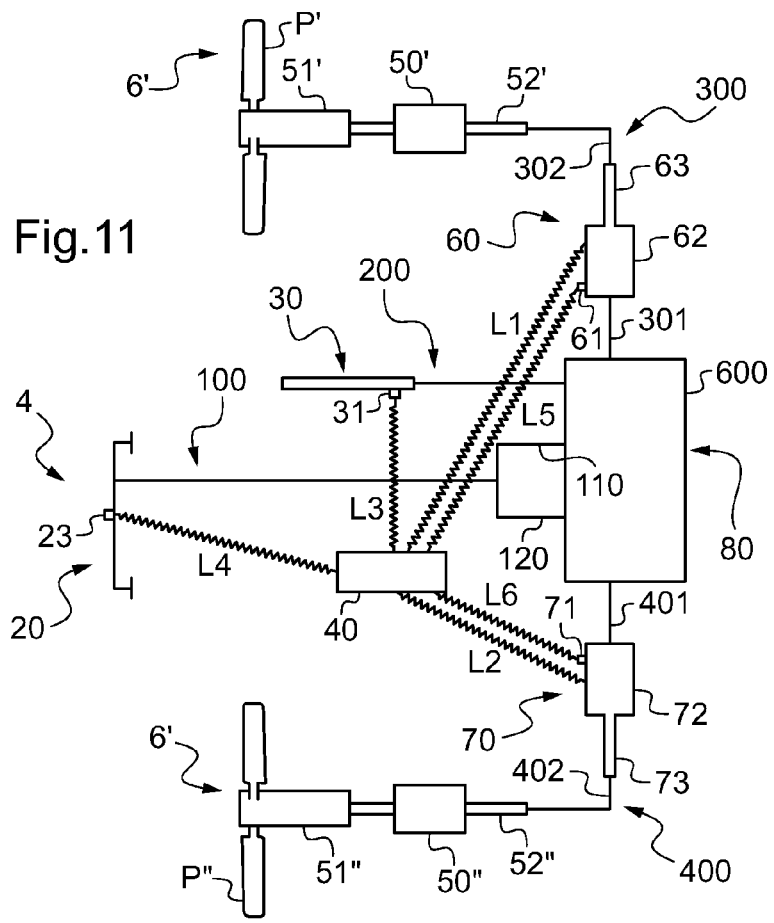
FIG. 11 is a diagram showing a yaw control device in a firth embodiment.

FIG. 11 shows a fifth embodiment suitable for implementing the third variant of the method.

In accordance with this fifth embodiment, the adjustment means comprise the combiner 80 of the combiner/coupler type 600 and the adjustable elements 60, 70 that appear in FIG. 8.

The fifth embodiment is thus obtained by replacing the combiner 80 of the conventional combiner type 601 of the third embodiment by the combiner 80 of the combiner/coupler type 600 of the first embodiment.

It will be understood that unlike the third embodiment, the first distance traveled by the first upstream secondary linkage 301 is different from the second distance traveled by the second upstream secondary linkage 401 insofar as the combiner 80 is here a combiner/coupler 600 and not a conventional combiner 601.

Figure 12:
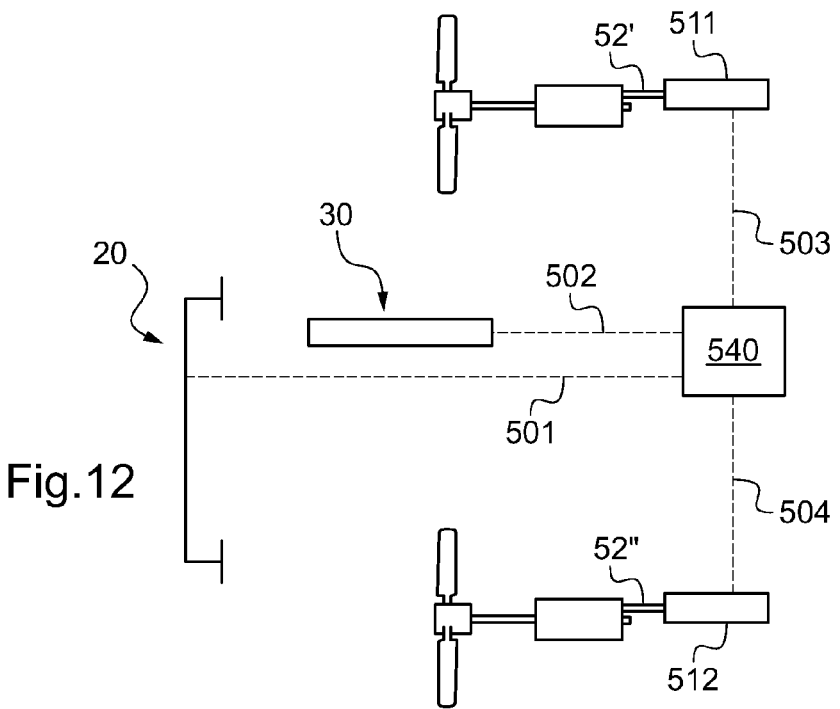
FIG. 12 is a diagram showing a yaw control device in a sixth embodiment.

Finally, FIG. 12 shows a sixth embodiment suitable for implementing all of the variants of the method.

The adjustment means comprise fourth optimization means, namely second computer means 540 connected via electrical or optical links 501, 502, 503, 504 to:
the thrust control 30;
the yaw control means 20; and
first and second control actuators 511, 512.

The second computer means 540 then optimize the original order O1 as a function of the thrust control 30 to obtain an optimized yaw control order O2 for transmission to the first and second control actuators 511, 512.

Any of the variants of the method can be implemented by appropriately programming the second computer means 540.

The first and second actuators then control first and second control members for the first and second pitches. More precisely, the first and second actuators serve to move the first and second control rods 52', 52" in order to adjust the first and second pitches.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, the first and second computer means may be made up of a plurality of independent computer modules for reasons of redundancy and operating reliability, e.g. of one to four computer modules.

Similarly, the first and second actuators may be made up of a plurality of actuators connected in series for reasons of redundancy and operating reliability.

What is claimed is:

1. A method of controlling the yaw attitude of a hybrid helicopter having a fuselage and comprising:
a main lift rotor arranged above said fuselage;
first and second propellers disposed on either side of said fuselage;
a thrust control suitable for modifying a first pitch of first blades of the first propeller and a second pitch of second blades of the second propeller by the same quantity; and
yaw control means suitable for generating an original order (O1) for modifying the yaw attitude of said hybrid helicopter by increasing the pitch of said first blades and by decreasing the pitch of said second blades by a differential pitch; wherein said original order (O1) is optimized as a function of the position of the thrust control to obtain an optimized yaw control order (O2) that is applied to said first and second blades.

2. A method according to claim 1, wherein, in order to obtain said optimized order, said original order (O1) given in differential pitch degrees is corrected by adding to said original order (O1) a corrective term that is a function of the position of the thrust control in accordance with the following first relationship:

$$O2=O1+P0*[1-(PCOM/100)]$$

where O2 represents said optimized order, O1 represents said original order, P0 represents the differential pitch at zero thrust and when the yaw control means is centered, PCOM represents the resultant thrust percentage generated by the thrust control in percent, and "*" and "/" represent respectively the multiplication sign and the division sign.

3. A method according to claim 1, wherein in order to obtain said optimized order, said original order is modulated by a variable gain that is variable as a function of the position of the thrust control and a corrective term is added that is a function of the position of the thrust control in accordance with the following third relationship:

$$O2=O1*G+P0*[1-(PCOM/100)]$$

where O2 represents said optimized order, O1 represents said original order, G represents said gain, P0 represents said differential pitch at zero thrust and when the yaw control means are centered, PCOM represents the resultant thrust percentage generated by the thrust control in percent, and "*" and "/" represent respectively the multiplication sign and the division sign.

4. A method according to claim 1, wherein, in order to obtain said optimized order, said original order is modulated by a variable gain that is variable as a function of the thrust control in accordance with the following second relationship:

$$O2=O1*G$$

where O2 represents said optimized order, O1 represents said original order, G represents said gain, and "*" represents the multiplication sign.

5. A method according to claim 4, wherein said gain (G) decreases from a maximum gain (GMAX) applied when said thrust control generates a minimum resultant thrust from the first and second propellers towards a minimum gain (GMIN) applied when the thrust control generates a maximum resultant thrust from the first and second propellers.

6. A method according to claim 5, wherein said gain (G) is determined using the following fourth relationship in which "G" represents said gain, "GMIN" said minimum gain, "GMAX" said maximum gain, "PCOM" the resultant thrust percentage generated by the position of the thrust control at a given instant, in percentage, and "*" and "/" represent respectively the multiplication sign and the division sign:

$$G=GMAX-[(GMAX-GMIN)*(PCOM/100)]$$

7. A method according to claim 5, wherein said minimum gain (GMIN) is equal to one third of said maximum gain (GMAX).

8. A method according to claim 1, wherein, in order to obtain said optimized order, said original order (O1) given in differential pitch degrees is corrected by adding to said original order (O1) a corrective term that is a function of the position of the thrust control.

9. A method according to claim 8, wherein the corrective term is based upon the differential pitch at zero thrust and when the yaw control means is centered, and the resultant thrust percentage generated by the thrust control in percent.

10. A hybrid helicopter having a fuselage and comprising:
a main lift rotor arranged above said fuselage;
first and second propellers disposed on either side of said fuselage;
a thrust control suitable for modifying a first pitch of first blades of the first propeller and a second pitch of second blades of the second propeller by the same quantity;
a yaw control device provided with yaw control means suitable for generating an original order (O1) for modifying the yaw attitude of said hybrid helicopter by increasing the pitch of said first blades and by decreasing the pitch of said second blades by a differential pitch; and
a combiner suitable for combining a thrust control order and a differential pitch control order;
wherein said yaw control device includes adjustment means suitable for optimizing said original order (O1) as a function of the position of the thrust control in order to obtain an optimized yaw control order (O2) for application to said first and second blades.

11. A hybrid helicopter according to claim 10, wherein said adjustment means comprise said combiner connected to the yaw control means via at least a left link and a right link, to the thrust control by a second main linkage, to a first control member for controlling the first pitch via a first secondary linkage, and to a second control member for controlling the second pitch via a second secondary linkage, said combiner comprising:
a carrier structure having a first end zone hinged on a support with a second end zone hinged to said second main linkage;
a first lever having a first end hinged to the left link and a second end hinged to the first secondary linkage, said first lever being free to pivot about a first fastener axis fastening it to said carrier structure;
a second lever having a first end hinged to the right link and having a second end hinged to the second secondary linkage, said second lever being free to pivot about a second fastener axis fastening it to said carrier structure; and
a first lever arm separating the first end of the first lever from said first fastener axis being shorter than a second lever arm separating the second end of the second lever from said second fastener axis.

12. A hybrid helicopter according to claim 10, wherein said adjustment means comprise a crank arranged in series in a first main linkage between an upstream first main linkage connected to the yaw control means and a downstream first main linkage going towards said combiner, said crank being provided with an upstream radius and a downstream radius forming an angle between them, said upstream radius being fastened to said upstream first main linkage while said downstream radius is linked to said downstream first main linkage, said crank including quotient-varying means for varying the quotients of the second length of the downstream radius divided by the first length of the upstream radius, said quotient varying means being mechanically controlled by the thrust control.

13. A hybrid helicopter according to claim 10, wherein said adjustment means include a second computer connected in particular firstly to the thrust control and to the yaw control via electrical or optical connections, and secondly to first and second control actuators for controlling respective first and second control members for controlling the first and second pitches, said second computer means optimizing said original order (O1) as a function of the position of the thrust control to obtain an optimized yaw control order (O2) that is applied to the first and second control actuators.

14. A hybrid helicopter according to claim 10, wherein said adjustment means comprise a first adjustable element of a first secondary linkage and a second adjustable element of a second secondary linkage, and first computer means of said adjustment means being suitable for modifying the lengths of said first and second adjustable elements as a function of the thrust control to modulate said original order by a variable gain that varies as a function of the position of said thrust control.

15. A hybrid helicopter according to claim 14, wherein at least one adjustable element comprises an actuator secured to an upstream secondary linkage and a downstream secondary linkage, said actuator being provided with an actuator body and an actuator rod, the yaw control means moving said upstream secondary linkage via a combiner over a first distance (DIS1) in a first travel direction, and said first computer means cause said actuator rod to be moved relative to said actuator body over a second distance (DIS2) in a second travel direction opposite to said first travel direction, said second distance (DIS2) being determined by said first computer means using the following equation:

$$DIS2=DIS1*(1-G)$$

where G represents said variable gain.

16. A hybrid helicopter according to claim 14, wherein said adjustment means include one position sensor per adjustable element connected to said first computer means to provide it with information relating to the length of the corresponding adjustable element.

17. A hybrid helicopter according to claim 14, wherein said adjustment means include a thrust sensor connected to said first computer means to provide it with first information relating to the position of said thrust control.

18. A hybrid helicopter according to claim 14, wherein said adjustment means include a yaw sensor connected to said first computer to provide it with second information relating to the position of said yaw control means.

19. A method of controlling the yaw attitude of a hybrid helicopter having a fuselage and comprising:
 a main lift rotor arranged above said fuselage;
 a first propeller disposed on a first side of said fuselage;
 a second propeller disposed on a second side of said fuselage;
 a thrust control suitable for modifying a first pitch of first blades of the first propeller and a second pitch of second blades of the second propeller, the first pitch being the same as the second pitch; and
 yaw controller suitable for generating an original order (O1) for modifying the yaw attitude of said hybrid helicopter by increasing the pitch of said first blades and by decreasing the pitch of said second blades by a differential pitch; wherein said original order (O1) is optimized as a function of the position of the thrust control to obtain an optimized yaw control order (O2) that is applied to said first and second blades.

20. A method according to claim 19, wherein, in order to obtain said optimized order, said original order (O1) given in differential pitch degrees is corrected by adding to said original order (O1) a corrective term that is a function of the position of the thrust control in accordance with the following first relationship:

$$O2=O1+P0*[1-(PCOM/100)]$$

where O2 represents said optimized order, O1 represents said original order, P0 represents the differential pitch at zero thrust and when the yaw control means is centered, PCOM represents the resultant thrust percentage generated by the thrust control in percent, and "*" and "/" represent respectively the multiplication sign and the division sign.

* * * * *